United States Patent
Bai et al.

(10) Patent No.: US 12,523,152 B2
(45) Date of Patent: Jan. 13, 2026

(54) COMBINED PROCESS OF INTEGRATING STOPING-BACKFILLING AND CARBON STORAGE

(71) Applicant: Taiyuan University of Technology, Taiyuan (CN)

(72) Inventors: Jinwen Bai, Taiyuan (CN); Junbiao Ma, Taiyuan (CN); Yanna Han, Taiyuan (CN); Ruikai Pan, Taiyuan (CN); Xudong Shi, Taiyuan (CN); Guowei Wu, Taiyuan (CN); Jun Guo, Taiyuan (CN); Jian Li, Taiyuan (CN); Fei Chang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 263 days.

(21) Appl. No.: 18/364,727

(22) Filed: Aug. 3, 2023

(65) Prior Publication Data
US 2024/0360761 A1    Oct. 31, 2024

(30) Foreign Application Priority Data
Apr. 28, 2023 (CN) .......................... 202310479121.8

(51) Int. Cl.
| | | |
|---|---|---|
| E21F 15/00 | (2006.01) | |
| C04B 14/06 | (2006.01) | |
| C04B 18/04 | (2006.01) | |
| C04B 22/06 | (2006.01) | |
| C04B 22/14 | (2006.01) | |

(Continued)

(52) U.S. Cl.
CPC ............ *E21F 15/005* (2013.01); *C04B 14/06* (2013.01); *C04B 18/0418* (2013.01); *C04B 22/064* (2013.01); *C04B 22/143* (2013.01); *C04B 40/0231* (2013.01); *C04B 2111/00017* (2013.01); *C04B 2111/00724* (2013.01); *Y02C 20/40* (2020.08)

(58) Field of Classification Search
CPC .... E21F 15/005; C04B 14/06; C04B 18/0418; C04B 22/064; C04B 22/143; C04B 40/0231; C04B 2111/00017; C04B 2111/00724; Y02C 20/40
See application file for complete search history.

(56) References Cited

U.S. PATENT DOCUMENTS

2024/0360762 A1* 10/2024 Feng ....................... E21F 17/16

FOREIGN PATENT DOCUMENTS

WO    WO-2022118731 A1 *  6/2022 ............. E04G 21/02

* cited by examiner

*Primary Examiner* — Janine M Kreck
(74) *Attorney, Agent, or Firm* — Volpe Koenig

(57) ABSTRACT

Disclosed is a combined process of integrating stopping-backfilling and carbon storage. The combined process includes the following steps of: determining a cyclic interval of a working face through measured data of a mine pressure of a fully-mechanized coal winning working face; when the stopping distance of the fully-mechanized coal winning working face reaches a backfilling isolation interval, providing a backfilling tarpaulin behind a hydraulic support, and pumping, through a backfilling pipeline, backfilling slurry to a backfilling area along a support beam; when the area is backfilled with the backfilling slurry, injecting supercritical carbon dioxide into the backfilling slurry; and allowing the supercritical carbon dioxide to fully react with the backfilling slurry to solidify the backfilling slurry.

7 Claims, 3 Drawing Sheets

(51) Int. Cl.
*C04B 40/02* (2006.01)
*C04B 111/00* (2006.01)

COMBINED PROCESS OF INTEGRATING STOPING-BACKFILLING AND CARBON STORAGE

CROSS-REFERENCE TO RELATED APPLICATION

This patent application claims the benefit and priority of Chinese Patent Application No. 2023104791218 filed with the China National Intellectual Property Administration on Apr. 28, 2023, the disclosure of which is incorporated by reference herein in its entirety as part of the present application.

TECHNICAL FIELD

The present disclosure relates to the technical fields of emission reduction and carbon reduction, as well as coal mining, in particular to a combined process of integrating stopping-backfilling and carbon storage.

BACKGROUND

"Carbon peak and carbon neutrality" is a development concept renewal and a development path change under the background of global climate governance and green development transition. In the practice on the carbon peak and carbon neutrality, the technology for carbon capture, utilization and storage develops constantly as a large-scale greenhouse gas emission reduction technology. Meanwhile, in order to prevent mining-induced environment damage and solve the problem of coal under building, water and villages, the backfilling mining has become an important part of green mining. The goaf after stopping in the working face becomes a natural space for carbon dioxide storage. Therefore, there is an urgent need for a method of backfilling and supporting the goaf after stopping in a working face and synchronously storing carbon dioxide, so as to maximize the use of abandoned space.

At present, there are many technologies for carbon storage by using the goaf A novel method for waste concrete deposit and carbon dioxide storage in an abandoned mine shaft is disclosed in Chinese Patent Publication No. CN107780965A. Through the method, the waste concrete is backfilled into a goaf, and then carbon dioxide is stored, which effectively realizes carbon storage. However, the problem that a gas flows out of overburden cracks is not considered. A method for carbon dioxide storage by using a waste mine shaft is disclosed in Chinese Patent Publication No. CN11321700A. Through this method, the state of the carbon dioxide is converted into a solid or liquid state and then is directly injected into a waste old goaf for effective carbon dioxide capture and storage. However, the flowing out of the carbon dioxide gas is not considered.

According to "Mine Pressure and Rock Strata Control" published by China University of Mining and Technology Press in September 2010, a weighting interval x of the fully-mechanized coal winning working face can be calculated by $x=(h\sqrt{(R\_T/3g)})/2.45$ (see Chapter 4, particularly Section 3 II, in "Mine Pressure and Rock Strata Control"), where h represents a mining height, RT represents a reaction force formed by the contact of the old roof rock layer with the fallen gangue in the goaf, and q represents an overlying rock load.

To sum up, it is urgent to find out a combined process of synchronously supporting the backfilling body and storing the carbon dioxide in the stopping process of a working face. In the stopping process of the working face, the backfilling reinforcement for the overburden and the carbon dioxide storage are carried out simultaneously, the goaf is maximized. Thus, a new combined mining technology is formed, which is in line with the strategic goal of green mining and carbon neutrality in China, and has important practical significance.

SUMMARY

For the defects in the prior art, an objective of some embodiments is to provide a combined process of integrating stopping-backfilling and carbon storage, which achieves the synchronization of grouting, backfilling and carbon dioxide storage in a goaf After stopping a certain distance in a working face, the backfilling slurry is injected into the rear goaf, and supercritical carbon dioxide is injected into the backfilling slurry at the same time. After the backfilling slurry fully reacts with the supercritical carbon dioxide to form a certain bearing capacity, the process of stopping is continued. The synchronization of stopping-backfilling and carbon dioxide storage on the working face is achieved, an abandoned space after coal mining is fully utilized, and a new storage solution is provided for carbon dioxide storage.

A combined process of integrating stopping-backfilling and carbon storage includes a specific method as follows:
step 1, calculating a backfilling isolation interval according to mine pressure data of a fully-mechanized coal winning working face, and determining a strength of a backfilling body according to a roof pressure, where the backfilling isolation interval is less than a weighting interval of the fully-mechanized coal winning working face;

step 2, determining a cyclic interval of the fully-mechanized coal winning working face;

step 3, carrying out a coal mining operation on the fully-mechanized coal winning working face, and stopping the stopping when a stopping distance of the fully-mechanized coal winning working face reaches the backfilling isolation interval;

step 4, after a scraper conveyor is pushed and a hydraulic support is moved, providing a backfilling tarpaulin behind the hydraulic support, and pumping, through a slurry backfilling pipeline, a backfilling slurry to a backfilling area along a support beam;

step 5, injecting supercritical carbon dioxide into the backfilling slurry while injecting the backfilling slurry, and enabling the supercritical carbon dioxide to fully react with the backfilling slurry for 3-5 h, enabling the supercritical carbon dioxide to fully react with the backfilling slurry to solidify the backfilling slurry, where the solidified backfilling slurry is able to provide an early support with a strength of 1.8 MPa to 2.3 MPa; and step 6, continuing to advance the fully-mechanized coal winning working face, repeating the step 3 to the step 5 until the stopping of the fully-mechanized coal winning working face is all completed.

Preferably, the step 1 further includes collecting and obtaining the mine pressure data of the fully-mechanized coal winning working face by a sensor for a roof pressure arranged in advance in an adjacent working face which is proximate to the fully-mechanized coal winning working face, and calculating a range of the mine pressure of the fully-mechanized coal winning working face according to data of a mine pressure of the adjacent working face.

Preferably, the step 2 further includes determining the cyclic interval by the backfilling isolation interval and the stopping distance, which is from the actual production capacity of the working face and is determined by a cutting speed and backfilling speed of a coal cutter.

Preferably, the step 3 further includes arranging the fully-mechanized coal winning working face in a hard coal seam with a uniform thickness, where the fully-mechanized coal winning working face is mined by adopting full-height mining at one time.

Preferably, the step 3 further includes supporting the fully-mechanized coal winning working face by the hydraulic support, arranging two rear support beams of the support beam behind the hydraulic support, and lapping the backfilling tarpaulin to the two rear support beams.

Preferably, the step 3 further includes hinging and fixing the two rear support beams to a rear portion of the hydraulic support, extending rear ends of the two rear support beams above the backfilling body, and arranging the slurry backfilling pipeline and the supercritical carbon dioxide backfilling pipeline on the hydraulic support.

Preferably, in the step 4, the backfilling slurry is prepared from water, cement, caustic sludge, sand and admixture in proportion; a ratio of the caustic sludge to the sand is 5:2 to 5:4, the cement is added with a mass of 10%-20% of the mass of three solid raw materials which include the caustic sludge, the sand and the cement, and the admixture is mainly a compound activator prepared from CaO and $CaSO_4$ in a ratio of 1:1 and has a mass of 1%-1.5% of the total mass of solid raw materials, and the backfilling slurry with a mass concentration of 74%-80% is prepared by adding water into the admixture, the caustic sludge, the sand and the cement.

Preferably, the caustic sludge is waste residue with calcium salts of $CaCO_3$, $CaSO_4$ and $CaCl_2$) as main components, where $CaCO_3$ accounts for 40%-70% of a total mass of the caustic sludge, and the prepared backfilling slurry is alkaline, with a pH value of 9-11; the supercritical carbon dioxide fully reacts with $CaCO_3$ after injection to absorb a large amount of the supercritical carbon dioxide, so as to achieve chemical storage for the supercritical carbon dioxide.

Preferably, the supercritical carbon dioxide is converted and formed by a carbon dioxide converter through a carbon dioxide collector on an earth surface, and is pumped to a gate entry through a connecting pipeline.

Some embodiments have the beneficial effects as follows.

A cyclic interval of a working face is determined through measured mine pressure data of a fully-mechanized coal winning working face. When a stopping distance of the fully-mechanized coal winning working face reaches the backfilling isolation interval, a backfilling tarpaulin is provided behind a hydraulic support. A backfilling pipeline is used to pump the backfilling slurry to a backfilling area along a support beam. When the backfilling area is full of the backfilling slurry, supercritical carbon dioxide is injected into the backfilling slurry. The supercritical carbon dioxide fully reacts with the backfilling slurry to solidify the backfilling slurry. The above described method can achieve synchronization of stopping-backfilling and supercritical carbon dioxide storage, achieve the maximum use of the abandoned goaf, and has a practical value.

Figure 1:
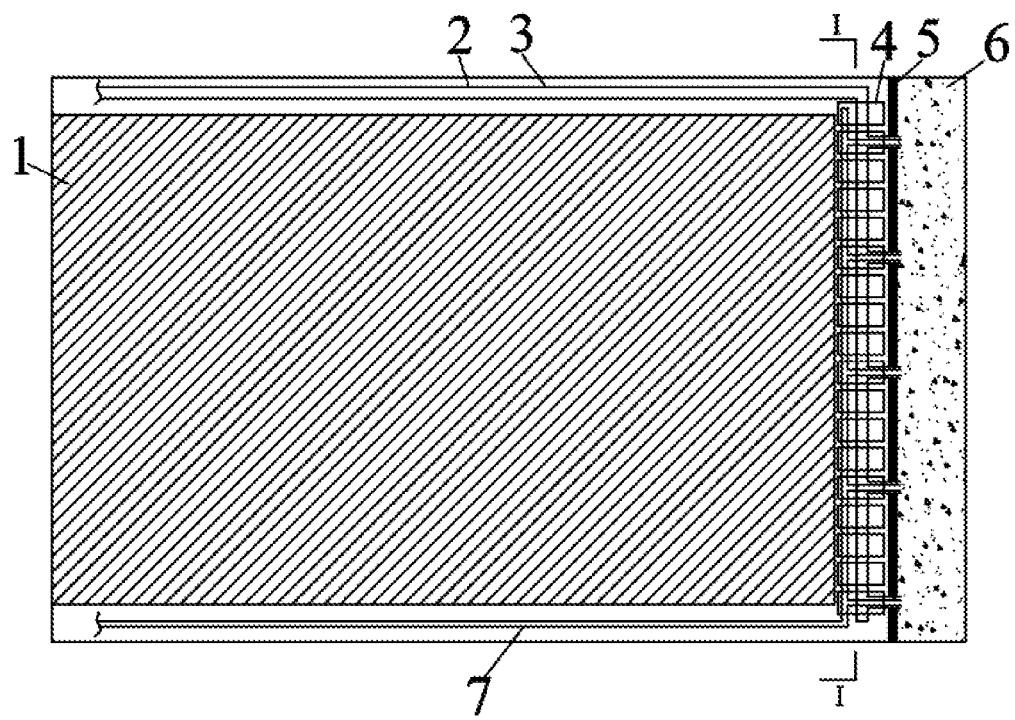
FIG. 1 is a schematic diagram of a mine in a start stage of a combined process of integrating stopping-backfilling and carbon storage according to an embodiment of the present disclosure.
Figure 2:
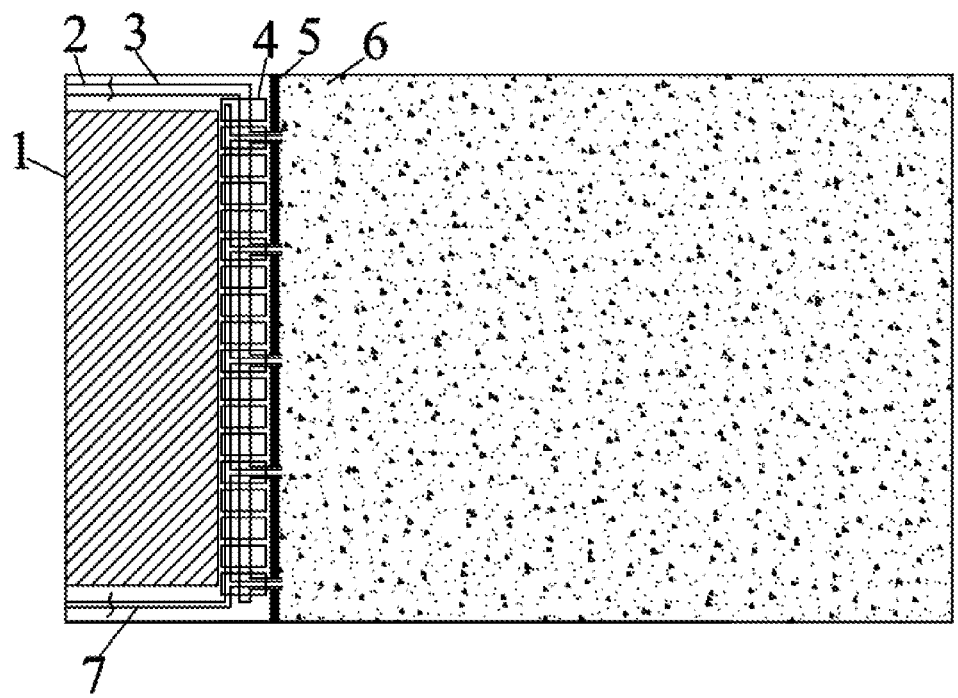
FIG. 2 is a schematic diagram of a mine in an end stage of a combined process of integrating stopping-backfilling and carbon storage according to an embodiment of the present disclosure.
Figure 3:
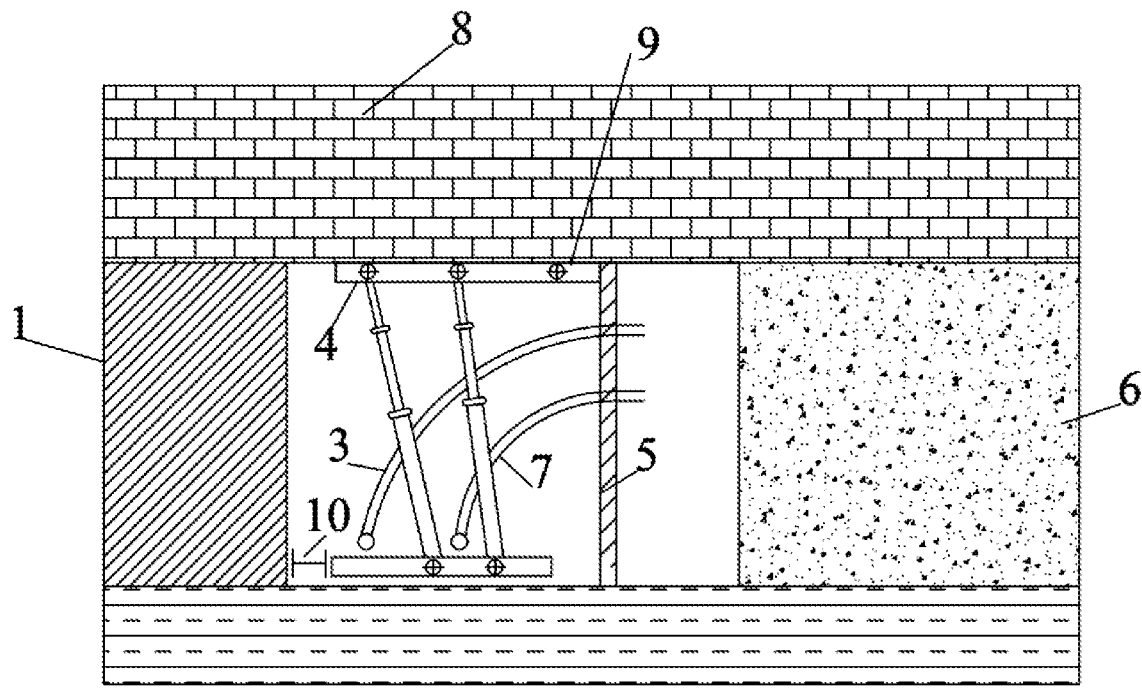
FIG. 3 is a sectional view along an I-I line in FIG. 2.
Figure 4:
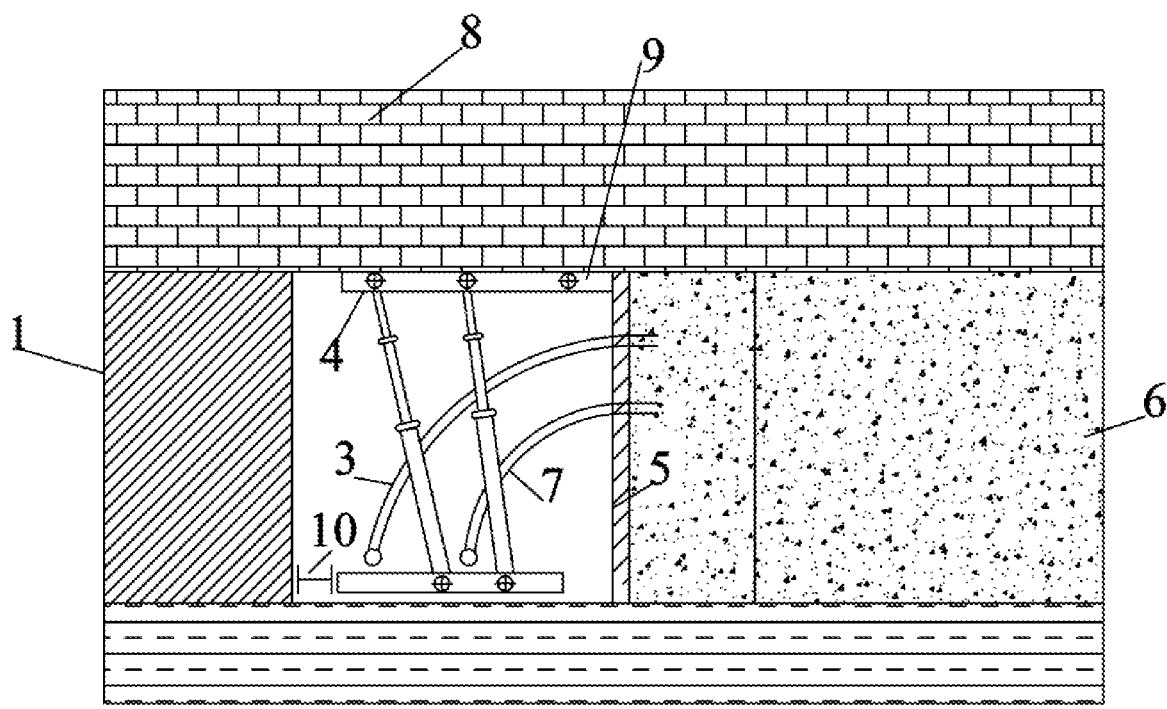
FIG. 4 is a structural schematic diagram of the mine in FIG. 3 after grouting.
Figure 5:
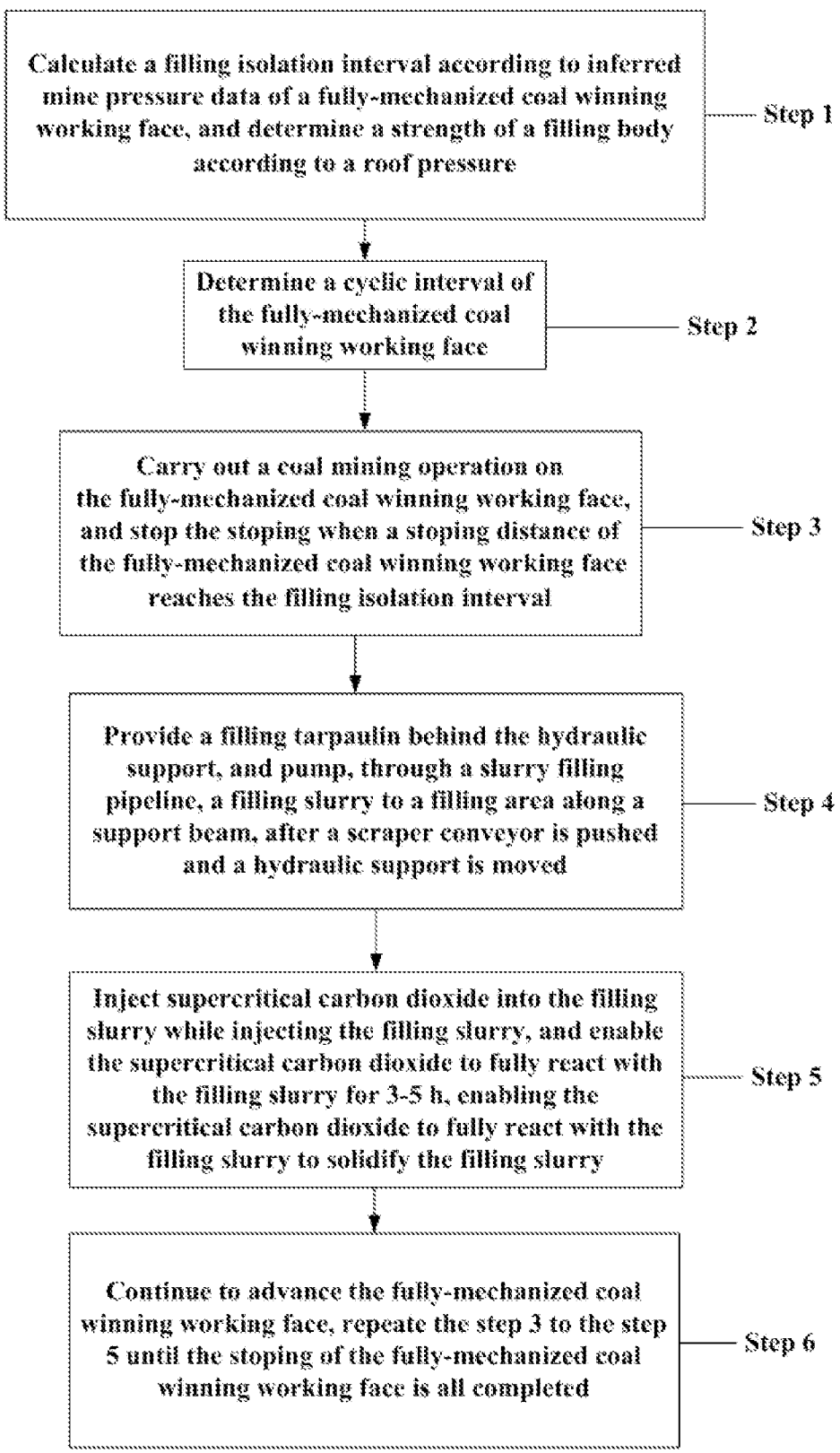
FIG. 5 is a flowchart of the combine process of integrating stopping-backfilling and carbon storage according to an embodiment of the present disclosure.

In the drawings: 1 coal seam; 2 gate entry; 3 slurry backfilling pipeline; 4 hydraulic support; 5 backfilling tarpaulin; 6 backfilling body; 7 supercritical carbon dioxide backfilling pipeline; 8 roof strata; 9 rear support beam; 10 scraper conveyor.

DETAILED DESCRIPTION OF THE EMBODIMENTS

The following embodiments are intended to be a schematic illustration and explanation of the present disclosure and are not intended to limit the scope of the present disclosure.

In order to have a clearer understanding of the technical objectives, features and effects of the present disclosure, a combined process of integrating stopping-backfilling and carbon storage is described in further detail with reference to the accompanying drawings.

An underground elevation of a fully-mechanized coal winning working face in a mine is −353.2 m, and a main coal seam has a simple structure and no major faults. At present, a main mining working face has a strike length of 800 m, an inclined length of 120 m and an average coal seam thickness of 3 m, and is mined by using a mode of full-height mining at one time. The coal seam of the main mining working face has a dip angle of 4-8°, and thus belongs to a near-horizontal coal seam. An immediate roof is fine sandstone, which generally has a thickness from 3 m to 4 m and is relatively stable, has a compressive strength from 30.25 MPa to 38.69 MPa. A main roof is limestone, has a thickness from 6 m to 10 m, hard rock strata, and a compressive strength from 86.34 MPa to 95.62 MPa. A supporting power plant for the mine is a thermal power plant in operation, the annual $CO_2$ emission of the supporting power plant reaches one million tons and more, and thus the amount of carbon tax to be paid each year is nearly ten million. By adopting the combined process of the present disclosure, $CO_2$ from the nearby power plant can be synchronously stored into a goaf. The implementation process is further described below with reference to the accompanying drawings, with specific implementation steps as follows.

In step 1, an adjacent working face for mining and backfilling is proximate to a working face. According to actual mine pressure data and roof activity of the adjacent working face, a periodic weighting interval of the adjacent working face is about 30 m to 35 m, the adopted backfilling isolation interval is 25 m, and a backfilling body has an early strength of 1.9 MPa and a long-term strength of 6.8 MPa. According to the actual situation of the adjacent working face, it is determined that the backfilling isolation interval of the working face is 25 m, the backfilling body has an early strength of 2 MPa, and a long-term strength of 6.9 MPa. The backfilling slurry is prepared from water, cement, caustic sludge, sand and admixture in proportion. A ratio of the caustic sludge to the sand is 5:3, the cement is added with a mass of 15% of the mass of three solid raw materials which include the caustic sludge, the sand and the cement, and the admixture is mainly a compound activator prepared from CaO and CaSO$_4$ in a ratio of 1:1 and has a mass of 1.5% of the total mass of solid raw materials. The backfilling slurry with a mass concentration of 78% is prepared by adding water into the admixture, the caustic sludge, the sand and the cement.

In step 2, CO$_2$ exhausted from the power plant is converted into supercritical CO$_2$ through a carbon dioxide collector and a converter on the ground, and then is pumped underground through a connecting pipeline.

In step 3, according to the existing technical conditions of a mine shaft and the movement parameters of the immediate roof of the adjacent fully-mechanized coal winning working face, the cyclic interval is determined to be 3 m.

In step 4, a coal seam 1 is subjected to stopping from the fully-mechanized coal winning working face, and the stopping is stopped when a stopping distance in the working face reaches the backfilling isolation interval.

In step 5, a scraper conveyor 10 is pushed, and a hydraulic support 4 is moved. A backfilling tarpaulin 5 is laid behind the hydraulic support 4, and a slurry backfilling pipeline 3 is laid along a gate entry 2 and the hydraulic support 4 to the position behind the backfilling tarpaulin 5. A supercritical carbon dioxide backfilling pipeline 7 is laid along the gate entry 2 and the hydraulic support 4 to the position behind the backfilling tarpaulin 5.

The slurry backfilling pipeline 3 and the supercritical carbon dioxide backfilling pipeline 7 are fixed to the hydraulic support 4, and the supercritical carbon dioxide gas is injected backwards through the supercritical carbon dioxide backfilling pipeline 7 crossing the hydraulic support.

In step 6, the backfilling slurry is pumped to the goaf behind the backfilling tarpaulin 5 through the slurry backfilling pipeline 3. Meanwhile, the supercritical carbon dioxide is pumped to the inside of the backfilling body 6 through the supercritical carbon dioxide backfilling pipeline 7. After the supercritical carbon dioxide fully reacts with the backfilling slurry for 3-5 h, the slurry can solidify to act as an early support with a strength of 1.8 MPa to 2.3 MPa.

In step 7, after the supercritical carbon dioxide fully reacts with the backfilling slurry to solidify the backfilling slurry, the working face continues to advance, and the step 4 to the step 6 are repeated to make the strength of the backfilling body reach a strength of 6.7 MPa to 8.3 MPa, which effectively controls the movement and deformation of the roof strata.

The foregoing embodiment is a preferred embodiment of the present disclosure, it should be noted that any variations and modifications made to the process above without departing from the technical essence and principle of the present disclosure fall within the scope of protection of the present disclosure.

What is claimed is:

1. A combined process of integrating stopping-backfilling and carbon storage, comprising the following steps:
    step 1, arranging a sensor for a roof pressure in an adjacent working face which is proximate to a fully-mechanized coal winning working face to collect data of a mine pressure of the adjacent working face and then obtain mine pressure data of the fully-mechanized coal winning working face according to the data of the mine pressure of the adjacent working face, determining that a strength of a backfilling body is larger than the roof pressure, and determining that a backfilling isolation interval is less than a weighting interval of the fully-mechanized coal winning working face;
    step 2, carrying out a coal mining operation on the fully-mechanized coal winning working face, and stopping the stopping when a stopping distance of the fully-mechanized coal winning working face reaches the backfilling isolation interval;
    step 3, after a scraper conveyor is pushed and a hydraulic support is moved, providing a backfilling tarpaulin behind the hydraulic support, and pumping, through a slurry backfilling pipeline, a backfilling slurry to a backfilling area along a support beam;
    step 4, injecting supercritical carbon dioxide into the backfilling slurry while injecting the backfilling slurry, and enabling the supercritical carbon dioxide to fully react with the backfilling slurry for 3-5 h, enabling the supercritical carbon dioxide to fully react with the backfilling slurry to solidify the backfilling slurry, wherein the solidified backfilling slurry is able to provide an early support with a strength of 1.8 MPa to 2.3 MPa; and
    step 5, continuing to advance the fully-mechanized coal winning working face by repeating the step 2 to the step 4 until the stopping of the fully-mechanized coal winning working face is all completed.

2. The combined process of integrating stopping-backfilling and carbon storage according to claim 1, wherein the step 2 further comprises arranging the fully-mechanized coal winning working face in a flat coal seam with a dip angle of less than 6°, wherein the fully-mechanized coal winning working face is mined by adopting full-height mining at one time.

3. The combined process of integrating stopping-backfilling and carbon storage according to claim 1, wherein the step 2 further comprises supporting the fully-mechanized coal winning working face by the hydraulic support, arranging two rear support beams of the support beam behind the hydraulic support, and lapping the backfilling tarpaulin to the two rear support beams.

4. The combined process of integrating stopping-backfilling and carbon storage according to claim 3, wherein the step 2 further comprises hinging and fixing the two rear support beams to a rear portion of the hydraulic support, extending rear ends of the two rear support beams above the backfilling body, and arranging the slurry backfilling pipeline and the supercritical carbon dioxide backfilling pipeline on the hydraulic support.

5. The combined process of integrating stopping-backfilling and carbon storage according to claim 1, wherein in the step 3, the backfilling slurry is prepared from water, cement, caustic sludge, sand and admixture in proportion; a ratio of the caustic sludge to the sand is 5:2 to 5:4, the cement is added with a mass of 10%-20% of the mass of three solid raw materials which include the caustic sludge, the sand and the cement, and the admixture is a compound activator prepared from CaO and CaSO$_4$ in a ratio of 1:1 and has a mass of 1%-1.5% of the total mass of the three solid raw materials, and the backfilling slurry with a mass concentration of 74%-80% is prepared by adding water into the admixture, the caustic sludge, the sand and the cement.

6. The combined process of integrating stopping-backfilling and carbon storage according to claim 5, wherein the caustic sludge is waste residue with calcium salts of CaCO$_3$, CaSO$_4$ and CaCl$_2$, wherein CaCO$_3$ accounts for 40%-70% of a total mass of the caustic sludge, and the prepared backfilling slurry is alkaline, with a pH value of 9-11; the supercritical carbon dioxide fully reacts with CaCO$_3$ after injection to absorb a large amount of the supercritical carbon dioxide, so as to achieve chemical storage for the supercritical carbon dioxide.

7. The combined process of integrating stopping-backfilling and carbon storage according to claim 1, further comprising converting and forming the supercritical carbon dioxide by a carbon dioxide converter through a carbon dioxide collector on an earth surface, and pumping the supercritical carbon dioxide to a gate entry through a connecting pipeline.

* * * * *